United States Patent
Lin et al.

(10) Patent No.: US 7,450,959 B2
(45) Date of Patent: Nov. 11, 2008

(54) WIRELESS MULTIPROCESSOR SYSTEM-ON-CHIP WITH UNIFIED MEMORY AND FAULT INHIBITOR

(75) Inventors: Jian Lin, San Diego, CA (US); Nicholas K. Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 10/841,739

(22) Filed: May 6, 2004

(65) Prior Publication Data

US 2005/0148358 A1   Jul. 7, 2005

Related U.S. Application Data

(60) Provisional application No. 60/533,857, filed on Dec. 31, 2003.

(51) Int. Cl.
*H04M 1/00* (2006.01)

(52) U.S. Cl. ............... 455/550.1; 455/410; 455/557; 714/42; 726/17

(58) Field of Classification Search ........... 455/550.1, 455/561, 560, 410, 423–425, 418, 411, 556.1, 455/557–559, 90.1; 712/32–34; 726/22–24; 711/147, 150, 152; 714/2, 9, 11, 15, 25, 714/30, 34, 48, 37–43, 47, 712, 821; 709/224, 709/213–216

See application file for complete search history.

(56) References Cited

U.S. PATENT DOCUMENTS

| | | | | |
|---|---|---|---|---|
| 5,881,060 | A  * | 3/1999 | Morrow et al. | 370/337 |
| 6,986,052 | B1 * | 1/2006 | Mittal | 713/190 |
| 7,302,606 | B2 * | 11/2007 | Fujimoto et al. | 714/9 |
| 2003/0162575 | A1 * | 8/2003 | Morota et al. | 455/575 |
| 2004/0127195 | A1 * | 7/2004 | An | 455/410 |
| 2005/0041510 | A1 * | 2/2005 | Khawand et al. | 365/230.03 |

* cited by examiner

*Primary Examiner*—George Eng
*Assistant Examiner*—Marcos L Torres
(74) *Attorney, Agent, or Firm*—John L. Ciccozzi; Nicholas J. Pauley; Thomas R. Rouse

(57) ABSTRACT

Wireless mobile communication device includes unified memory portion; processing units coupled with, and communicating through, unified memory; fault inhibitor coupled with unified memory inhibiting operational fault from nocent informon. Memory, fault inhibitor, and processing units fabricated on monolithic integrated circuit as system-on-chip disposed in wireless mobile personal host. Multiprocessor module includes fault inhibitor and applications and communications processing units and buses, coupled with unified memory. Integrated functional constituent can include coprocessor, accelerator, operational control unit, interprocessor controller, memory controller, bus management unit, bridge, arbiters, and transceiver. Method inhibits operational fault from nocent informon, setting device in operational or fallback state.

31 Claims, 4 Drawing Sheets

WIRELESS MULTIPROCESSOR SYSTEM-ON-CHIP WITH UNIFIED MEMORY AND FAULT INHIBITOR

RELATED APPLICATIONS

This application claims priority to U.S. Provisional Application No. 60/533,857 filed Dec. 31, 2003.

BACKGROUND

1. Technical Field

The present invention generally relates to wireless mobile apparatus and methods and, specifically, to wireless mobile multiprocessor apparatus and methods.

2. Background

Telecommunications services are evolving toward sharing richer and more realistic still and motion images, sound, and data across great distances, and doing so within the context of mobile services. Increasingly, personal financial transactions, commercial buying and trading transactions, health information, and other private messages may be exchanged using a mobile device, with attendant expectations of security. These and other applications and services may employ advanced compression, encryption, and signal modulation techniques. A vast range of consumer applications may be deployed with mobile devices, including sophisticated interactive services, familiar desktop applications, and operating system environments, indicating a need for both computing flexibility and power. Mobile devices that furnish superior and secure speech, audio, video, and data services, including real-time or isochronous communications, often employ compute-intensive, high-bandwidth, digital techniques. Additionally, a consumer may desire to use the same mobile device to receive these high-quality services from multiple service providers within a region or, while traveling through multiple regions, to receive services from different regional providers, who use different communication protocols. A mobile device capable of delivering an array of high-quality digital services, using different providers and protocols, commonly includes substantial computing power. Further, mobile device manufacturers and vendors may prefer a versatile, low cost, energy-efficient, and readily-manufacturable wireless platform as a basis for one or more products. Such a platform may be augmented by adding IP library-based components early in the manufacturing process, or by attaching inexpensive commodity components at the point-of-sale by a vendor—or even as an simple upgrade by a consumer—giving rise to a diversity of very compact, portable wireless mobile devices.

Therefore, there is a need for a mobile device which offers manufacturers and vendors a versatile, high-performance, compact wireless platform; and which also may offer consumers a compact, flexible, and feature-filled mobile device capable of relatively inexpensive and simple upgrades.

SUMMARY

A wireless mobile communication device includes a memory, which includes a unified memory; processing units; and a fault inhibitor. The processing units and a fault inhibitor are coupled with the unified memory portion. One processing unit communicates the message with another processing unit through the unified memory portion. The fault inhibitor is configured to inhibit an operational fault state corresponding to a nocent informon in the unified memory portion. The memory, processing units, and fault inhibitor are fabricated on a monolithic integrated circuit chip. The wireless mobile communication device, being coupled with a memory device, and being capable of having a unified memory portion when the memory device is connected with the wireless mobile communication device.

The wireless mobile communication device may further include an operational control unit configured to coordinate communication between the processing units communicating through the unified memory portion. The operational control unit is coupled with the unified memory, the processing units, and the fault inhibitor. The operational control unit also may manage memory resources selected as the unified memory portion. The operational control unit also can include a memory manager coupled with the memory and the fault inhibitor, and may be configured to cooperate with the fault inhibitor to inhibit the operational fault corresponding to the nocent informon. The first processing unit of the device may be adapted to perform first processor applications operations and the second processing unit may be adapted to perform second processor operations. The operational control unit can provide one or both of a process control signal and a memory control signal to coordinate exchange of messages between the first processing unit and the second processing unit. The wireless mobile communication device may include a functional constituent, which is coupled with and is configured to augment, one or both of the applications operations of the first processing unit and the communications operations of the second processing unit. This functional constituent can be an interprocessor communications manager, a graphics accelerator, or a digital signal processor.

The wireless mobile communication device also includes an application bus coupled with the first processing unit, and adapted to facilitate applications operations; a communications bus coupled with the second processing unit and adapted to facilitate communications operations; and a bus master unit coupled between the application bus and the communications bus. The bus master unit communicates one or both of control signals and messages between the applications bus and the communications bus. The device also can include a transceiver coupled with the communication bus and using a wireless communication technique to exchange the message with the remote host. The wireless mobile communication device may include a direct interface coupled with one or both of the applications bus and the communications bus, by which the wireless mobile communication device may be coupled with an information signal source.

The invention also provides a wireless mobile communication multiprocessor module adapted to exchange a message using wireless communication. The multiprocessor module includes an application bus and a communication bus; an applications processing unit coupled with the application bus; a communications processing unit coupled with the communication bus; memory having a unified memory portion and coupled with the application bus and the communication bus; a fault inhibitor coupled between the unified memory and one of the communication bus and the application bus; and an operational control unit coupled with the applications processing bus, the communications processing bus, the memory, and the fault inhibitor.

The operational control unit controls one or more of coordinating communication between the application bus and the communications bus; managing unified memory for at least one of the applications processing unit and the communications processing unit; and cooperating with the fault inhibitor provide a selected response to the presence of a nocent informon. The applications bus, the communications bus, the applications processing unit, the communications processing unit, the communication bus, the fault inhibitor, and the operational control unit are fabricated together as wireless mobile communication multiprocessor module monolithic integrated circuit.

The multiprocessor module can include a functional constituent responsive to the operational control unit and operably coupled with one of the application bus and the communications bus. This functional constituent can facilitate one or both of the applications processing unit's applications operations and the communications processing unit's communications operations. The operational control unit can include a memory manager cooperating with the fault inhibitor to provide the selected response to the presence of a nocent informon. The selected response includes inhibiting an operational fault corresponding to the nocent informon; operating the wireless mobile communication multiprocessor module in a predetermined operational state; or operating the wireless mobile communication multiprocessor module in a predetermined fallback state. The operational control unit also can include a bridge coupled between the application bus and the communication bus, and configured to selectively transmit a signal from one of the application bus and the communication bus to the other.

Embodiments of the invention also can provide a wireless mobile communication system, in which a local host exchanges a message with a remote host using wireless communication. The application system includes an applications bus coupled with the local host; and an applications processing unit coupled with the applications bus and executing applications operations. The system also includes a transceiver exchanging the message with the remote host using a wireless communication mode; a communications bus coupled with the transceiver; and a communications processing unit coupled with the communications bus and executing communications operations. In the system, a memory is coupled with the applications bus and the communications bus; and a portion of the memory is unified memory. The applications processing unit and the communications processing unit exchange the message using the unified memory. A fault inhibitor is employed to inhibit an operational fault state corresponding to a nocent informon, and is coupled with the memory, the applications processing unit, and the communications processing unit. The fault inhibitor can be coupled between the unified memory and one or both of the communications bus and the applications bus.

A memory controller controlling a memory location in the memory can be coupled with the memory, the fault inhibitor, and the applications and communications processing units. An interprocessor controller can be coupled between the applications bus and the communications bus, with the controller transferring a control signal between the applications processing unit and the communications processing unit, which facilitates the message exchange in unified memory. The applications processing unit, the communications processing unit, the applications bus, the communications bus, the interprocessor controller, the memory, the memory controller, and the fault inhibitor may be fabricated together as a monolithic integrated circuit.

The interprocessor controller of the wireless mobile communication system includes a bus management unit coupled between the applications bus and the communications bus, and coordinating communications therebetween; and a bridge coupled with the bus management unit, the applications bus, and the communications bus, the bridge configured to selectively transmit a signal from one of the applications and communications buses to the other, as a sender and a receiver, responsive to the bus management unit. In addition, the wireless mobile communication system includes an applications bus arbiter, coupled with the applications bus and the bus management unit; and a communications bus arbiter coupled with the communications bus and the bus management unit. The applications bus arbiter coordinates, with the bus management unit, a selective transmission of an applications bus signal between the sender and the receiver; and the communications bus arbiter coordinates, with the bus management unit, a selective transmission of a communications bus signal between the sender and the receiver. The wireless mobile communication system can include the transceiver being a functional constituent fabricated on the monolithic integrated circuit. The wireless communication mode can be selectable. The transceiver may include plural reconfigurable functional constituents controllable by the local host wherein the wireless communications mode is selectable thereby.

An embodiment of the invention also provides a method for communicating a message in a wireless mobile communication device configured to exchange the message as a local host with a remote host, where the device includes at least two processing units operating in association with informons, and a memory coupled with the processing units and through which the processing units communicate the message. The method includes identifying an informon to be examined; and determining whether the informon is a legitimate informon or a nocent informon. If the informon is the nocent informon then inhibiting storage of the nocent informon; inhibiting access to the nocent informon; or inhibiting execution of the nocent informon. If the informon is the nocent informon, the method also may include then providing a perceptible indication of nocent informon presence. Moreover, if the informon is the nocent informon, the method may inhibit an operational fault corresponding to the nocent informon. In the presence of a nocent informon, the method may include setting the wireless mobile communication device in a predetermined operational state, as well as setting the wireless mobile communication device in a predetermined fallback state. If the informon present is the nocent informon, then providing a perceptible indication of nocent informon presence.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Figure 1:
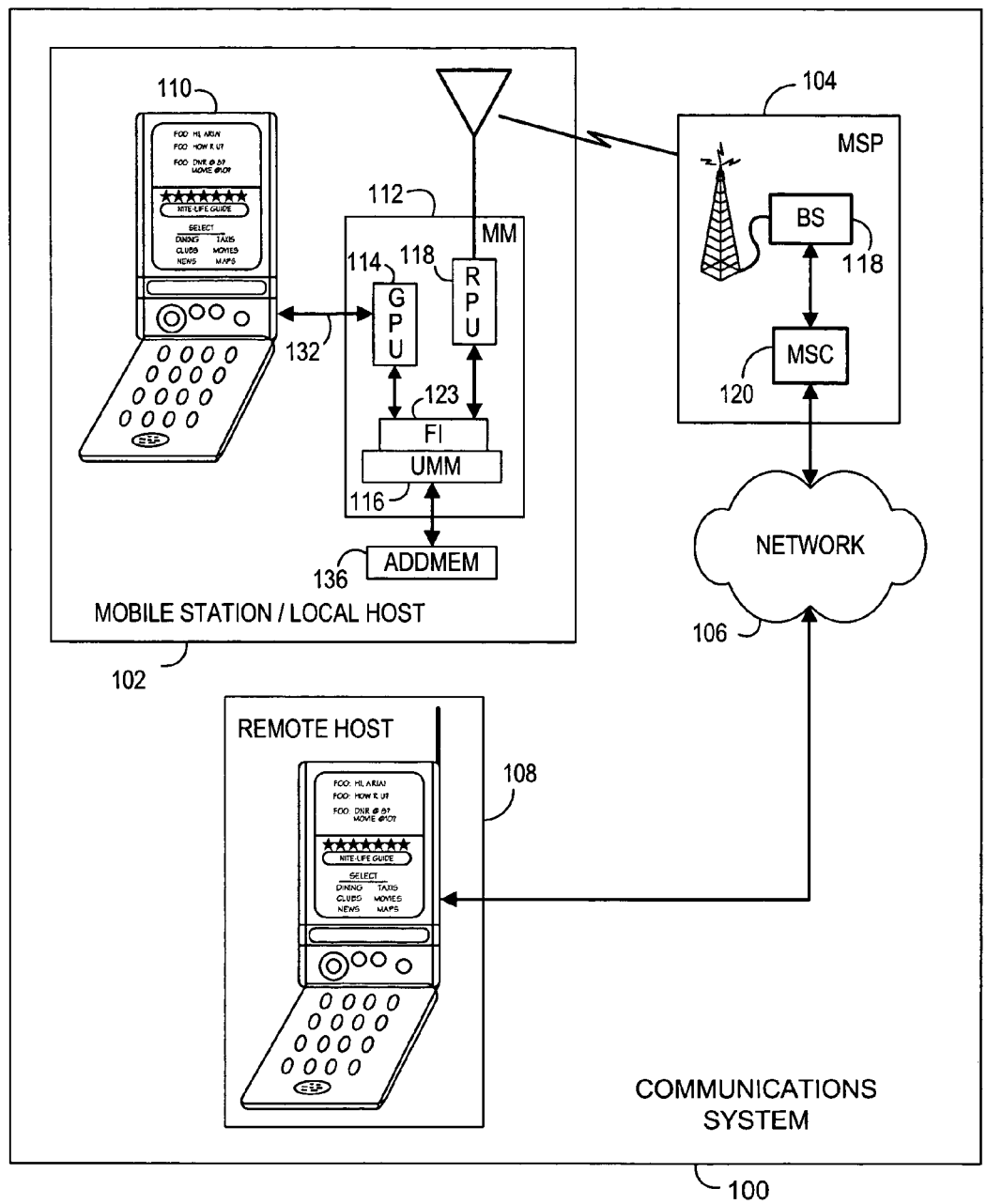
FIG. 1 is a simplified functional block diagram illustrative of a multiprocessor wireless communications system having unified memory fabricated on a monolithic semiconductor chip.

It is advantageous to provide a mobile wireless device which offers manufacturers and vendors a versatile, energy-efficient, compact wireless platform, and which also may offer consumers a compact, flexible, and feature-filled mobile device capable of relatively inexpensive and simply implemented upgrades. Such a platform typically may be a highly-integrated combination of high-performance computing and communications systems. The present apparatus and methods are directed to a wireless mobile platform manufactured as a single and monolithic semiconductor chip, sometimes referred to as a "system on a chip." Modern monolithic semiconductor chips may be based on one or more selected core devices, which may be augmented prior to fabrication, by including one or more selected components. A core computing device, herein a "processing unit," can be a general-purpose processor, a controller, a specialty real-time processor, a coprocessor, an accelerator, a special-purpose engine, a mixed-signal transceiver, a gate array device, state machine, or logic assembly. A general processing unit, such as an applications processing unit, generally can efficiently perform a variety of applications and support tasks, hence its name. General processing units frequently employ large, complex instruction sets to execute multitasking and multithreading operations, possibly while handling many concurrent application threads and support task interrupts. A special purpose processing unit, such as a communications processing unit, may be adapted for observing stringent time constraints and performing repetitive, computationally-oriented operations, in real time or in time-sensitive tasks. However, general processing units may benefit from augmentations and extensions, which may improve unit efficiency, for example, with time-sensitive tasks. Likewise, communications processing units may benefit from augmentations and extensions, which may improve unit efficiency, for example, with handling many interrupts or concurrent task threads during operations. Processing units can be construed by one skilled in the art to include plural cooperative processing units, including without limitation, a group, cluster, or array of processing units.

It may be desirable to augment and to extend the range and the nature of efficiently-executed functions offered by a particular type of processing unit core, by incorporating "functional constituents." Such functional constituents may include, without limitation, general purpose processing functional constituents, such as operating system kernels, multi-thread process schedulers, memory controllers, interrupt controllers, energy and power controllers, hardware and software wrappers, logic blocks, memory arrays and registers; image and video functional constituents, such as JPEG and MPEG codecs, transform/translate engines, and 2D/3D image processors; security functional constituents, including biometric analysis and authentication processors, and encryption/decryption engines and hash functions; speech and audio functional constituents, including companders, PCM-type codecs, and MP3 encoders; general digital signal processing functional constituents, including sensors, transcoders, synchronizers, multipliers, filters and transform processors; as well as administrative, operational, and special-purpose functional constituents including, application-specific instruction set extensions and operations, including multimedia extensions; high-performance networking, geolocation, and input/output engines; application-specific blocks, components, and arrays; multiply-and-accumulate and other computational blocks; mixed signal interfaces, and the like. A functional constituent may be made an integral aspect of a processing unit or may be a separate coprocessor, accelerator, or core. A functional constituent may be a defined component providing a defined function, or derive its functionality from multiple functional constituents combined to perform a selected function or group of functions. Functional constituents may cooperate with a processing unit without being physically incorporated therein. It is contemplated, however, that processing units and functional components of the wireless mobile system herein be fabricated as a monolithic semiconductor chip.

An exemplary general or applications processing unit may be augmented by adding specialized computation, graphics, signal/image processing, transform, encryption, signal mapping, and modem communication functional constituents. Likewise, an exemplary special purpose, or communications, processing unit may be augmented with text and data processing, interrupt controllers, multitasking and multithreaded operation controls and pipelines, operating system kernel subunits, data compression/decompression units, and multimedia application functional constituents. Core devices and functional constituents may readily be found in appropriate intellectual property (IP) component libraries, and are well-known in the art. Thus, a base core platform according to the present apparatus and methods, may provide a consumer with a compact, easy-to-use, and relatively inexpensive mobile station, which may be capable of running popular, often sophisticated, application programs, within the context of a familiar operating system environment. Also the present apparatus and methods can offer a rich multimedia feature set, including, for example, high-quality streaming video and audio. Furthermore, the present apparatus and methods may offer consumers a mobile station, which may be upgraded readily, and which may be operable in different coverage areas using different communication formats. At the same time, the present apparatus and methods may offer manufacturers and vendors a powerful, modular, economic, and manufacturable mobile device, readily configurable to meet a wide range of applications, communication channels, communication modes, and communication services. As used herein, a communication channel is a band of one or more frequencies used to create a signal path between two communicating points. A communication channel may be characterized by operating frequencies at which signals traverse the path, and the format by which signals are transmitted. A communication mode, or mode, generally refers to a characteristic set of one or more features, content, synchronization, or functional capabilities, corresponding to a service. A mode may be categorized by one or more of the following: the physical nature of electromagnetic signal; the signal modulation technique; and the signal propagation method, which may be employed for message exchange between a mobile wireless device user and a wireless service provider. Also, a communication mode may refer to one or more protocols used to exchange a message, and may include multiple, hierarchical protocol layers. A communication service includes the delivery of messages, i.e., digital content or information, using a selected communication channel and mode.

Turning to FIG. 1, a simplified functional block diagram of communications system 100 is illustrated, in which mobile station (MS) 102 exchanges messages with remote host (REMHOST) 108 over communications network (NETWORK) 106. NETWORK 106 can be representative of a connected aggregate of communications networks, links, feeders, and subnets, with at least a portion of NETWORK 106 including, for example, a public, packet-switched network such as the Internet. REMHOST 108 may represent any type of remote communication endpoint with which MS 102 may be able to communicate. A portion of NETWORK 106 may include one or more mobile service provider (MSP) 104 facilities, managed by a service operator (not shown). MSP 104 may couple one or more base stations (BS) 118 to NETWORK 106 using mobile switching center (MSC) 120.

In general, MS 102 and BS 118 exchange messages using one or more predetermined communication protocols. A message can be described as one or more logical data units formed from physical signals transmitted by one or both of MS 102 and BS 118. Desirably, message exchange may be bidirectional, full-duplex, or both. These protocols may correspond to physical and logical conventions and access methods used to initiate and maintain a mode of communication between MS 102 and BS 118. As used herein, MS 102 may incorporate mobile modem (MM) 112 within a local mobile terminal, such as mobile personal host terminal (MPH) 110, to create a convenient, compact, portable configuration, which easily may fit in a pocket or a purse, or be wearable. Familiar examples of mobile stations, so configured, include a portable telephone handset, a wireless pocket computing device, and a personal digital assistant. Desirably, MPH 110 provides an interface for message exchange between MM 112 and a user of MS 102. MPH 110 may be adapted to permit a user of MS 102 to be, for example, a human, or a machine to which a human has delegated a suitable task. MM 112 can provide substantial data manipulation and signal processing services, such as a message exchange interface, having a data path between MPH 110 and BS 118, and facilitating communication between MS 102 and MSP 104. Where REMHOST 108 is coupled to MSP 104 by way of NETWORK 106, MPH 110 and MM 112 cooperate to facilitate message exchange between MS 102 and REMHOST 108, using a selected communication mode.

MS 102 can be configured as a personal, compact, wireless electronic device, which offers a user convenient access to available digital services, and to a host of applications. MS 102 may be configured to deliver basic services including, for example, paging, telephony, and personal digital assistant features. MS 102 may be configurable to deliver selected enhanced services as well, for example, by the manufacturer, by a vendor at the point of sale, or by the user. Non-limiting exemplary enhanced services may include touch-screen functionality, handwriting recognition, Internet access, speech recognition and synthesis, context awareness, streaming audiovisual capture and display, sophisticated transaction and security functions, networking services, instant messaging, interactive distributed gaming, geographical information systems (GIS) related services, text and data transfer, symbolic exchanges, and electronic and voice mail. The aforementioned services and related applications may include security functions, or these functions may be afforded, for example, by the operating system. Beneficially, MM 112 also may be configured to sense, and to adapt to, more than one communication mode, including more than one signal modulation technique, allowing a user to roam disparate and remote coverage areas, while using the same MS 102. An adaptive, reconfigurable MS 102 may be advantageous to a manufacturer, or vendor, seeking a platform by which to offer additional wireless product options to consumers.

MSP 104, and associated BS(s) 118, can be positioned and operate within a geographic region, called a coverage area. A coverage area typically is managed by an SO, who may provide wireless communication services within the coverage area, including, without limitation, one or more basic or enhanced services, using one or more telecommunication frequency bands. Additionally, a SO may cooperate with third party providers to augment services available to subscribers within one or more coverage areas. Thus, with MS 102 configured as a multimodal, multiband wireless handset, a subscriber/user may receive multiple wireless communication services, in which messages are exchanged within one or more coverage areas, using a selected mode encompassing one or more communication frequency bands, signal propagation methods, communication protocols, message content, and the like.

Consumers increasingly demand affordable, versatile, feature-filled, energy-efficient, and compact mobile stations. Beneficially, MS 102 can be configured to perform sophisticated user applications, for example, communicating a high-quality real-time video stream. Applications of this nature can be computationally intensive from both application and communication standpoints. In addition to the computing demands arising from applications and communications, sophisticated system services, such as secure, multimodal, and adaptable message exchange, also may impose significant computing demands upon MM 112. On one hand, the variety of processing activities presented by a likely range of consumer application and communication programs tends to favor the use of a general purpose processing unit having a large, versatile instruction set, and possibly supporting parallelism, within MM 112. On the other hand, it may be beneficial for communication programs and system service operations to have a smaller set of instructions rapidly and repetitively executed on multiple data, while observing stringent time constraints. Therefore such communication programs and system services tend to invite the use of a special purpose processing unit, such as a digital signal processor (DSP). A single processing unit may be augmented to satisfy multithreaded, multitasking operation and interrupt support as well as compute-intensive application program, communication, and real-time operations. Nevertheless, a single processing unit capable of such general application and real-time diversity can occupy a relatively large device footprint and consume substantial power, despite attempts to power-down inactive circuits.

Thus, it is desirable to implement within MM 112, a multiprocessor module integrating at least two processing units, in which a first processing unit (GPU) 114 generally is adapted to perform application operations, possibly including interrupt-driven, multitasking and multithreading operations, and a second processing unit (RPU) 118 generally is adapted to perform communication operations, which may encompass signal-processing-intensive, time-constrained, time-sensitive, and real-time operations. First and second processing units, respectively GPU 114 and RPU 118, may be cooperatively coupled, and may share processing tasks, such that overall multiprocessor module throughput is increased. In instances where two or more processing units, such as GPU 114 and RPU 118, cooperate to provide a desired level of functionality and performance in MM 112, the architectural feature by which the processing units communicate may influence system efficiency, power consumption, upgradability, and the like.

MM 112 is beneficially configured to include an integrated multiprocessor module chip, having two or more processing units GPU 114 and RPU 118 communicating, using unified memory (UMM) 116. In general, UMM 116 may be a portion of memory available to one processing unit, e.g., GPU 114, which also may be available to another processing unit, e.g., RPU 118. Such access may be substantially synchronous access, substantially asynchronous access, substantially isochronous access, or a combination thereof. UMM 116 also may be configured to permit access to one or more functional constituents (not shown), which may be coupled with UMM 116. The memory devices used to form the unified memory space in UMM 116 may be commodity single-port memory devices, including for example, synchronous dynamic random access memory (SDRAM), double data rate, synchronous DRAM (DDR SDRAM or, simply, DDR), Rambus®

DRAM (RDRAM®) memory), and so on, but may include other types of inexpensive, readily-obtainable memory devices. (Rambus and RDRAM are registered trademarks of Rambus Inc., Los Altos, Calif., USA).

MM 112 may be self-contained, in that MS 102 may provide desired functionality without using an additional memory device. However, MM 112 may also be configured such that the memory space represented by ADDMEM 136 can be augmented by coupling MM 112 with ADDMEM 136. Through augmentation, MM 112 may be configured, adapted, or programmed to provide additional functionality, such that MS 102 may be offered for use or sale as an enhanced-feature wireless mobile handset, or may be upgraded by the owner/user of MS 102 to deliver enhanced services.

Communication devices, e.g., MS 102, which connect to public networks such as the Internet, may be exposed to noxious entities herein termed nocent informons. As used herein, an informon can be any logical entity including a message, datum, code, instruction, or signal, alone or in combination, which may be amenable to transmission, loading (read), storage (write), execution, processing, and the like, for example, in a processing unit, e.g., GPU 114, RPU 118, or in a functional constituent, such as memory, ADDMEM 136. Also as used herein, a nocent informon is an informon which may correspond to an operational fault state in all or any part of MM 112, MS 102, or communication system 100. A nocent informon may encompass any informon, which may degrade system confidentiality, integrity, or availability, as well as user authentication, authorization, or nonrepudiation. Degradation may be an intentional or unintentional effect of a nocent informon. Intentional degradation may result from a nocent informon being delivered to MS 102 in the form of a malicious code entity, such as a virus, a worm, a Trojan horse, a logic bomb, and the like. Unintentional degradation may result, for example, from an informon which, when read, written, or executed by a processing unit or functional constituent, degrades the operation of such processing unit or functional constituent. Unintentional degradation might result, for example, when an otherwise legitimate informon intended for execution by one processing unit is, in fact, executed by a second processing unit, leading to an operational fault. In the context of the second processing unit, the informon corresponding to the operational fault is a nocent informon.

In general, an operational fault state may describe any such deleterious or noxious effect, including, without limitation, informon corruption, destruction, diversion, misappropriation, or subversion; the induction or facilitation of intrusion, failure, degradation, or impairment of any component, functional constituent, processing unit, application, subroutine, process, device, or system. Thus, nocent informons may correspond to operational faults within MS 102 and, where expedient, fault inhibitor (FI) 123 can be integrated into MM 112 to inhibiting a nocent informon from causing or corresponding to an operational fault. It may be beneficial to couple FI 123 with selected unified memory ADDMEM 136 portions in MM 112, so that a nocent informon may be inhibited from corresponding to an operational fault state. FI 123 can be hardware, software, or an operable combination thereof, and may effectively be interposed between a processing unit e.g., GPU 114 or RPU 118, or functional constituent, and a portion of memory, e.g., ADDMEM 136, intended to interact with the processing unit or functional constituent. Processing units, such as GPU 114, RPU 118 may operate cooperatively, for example directed by a master processor such as RPU 118.

Figure 2:
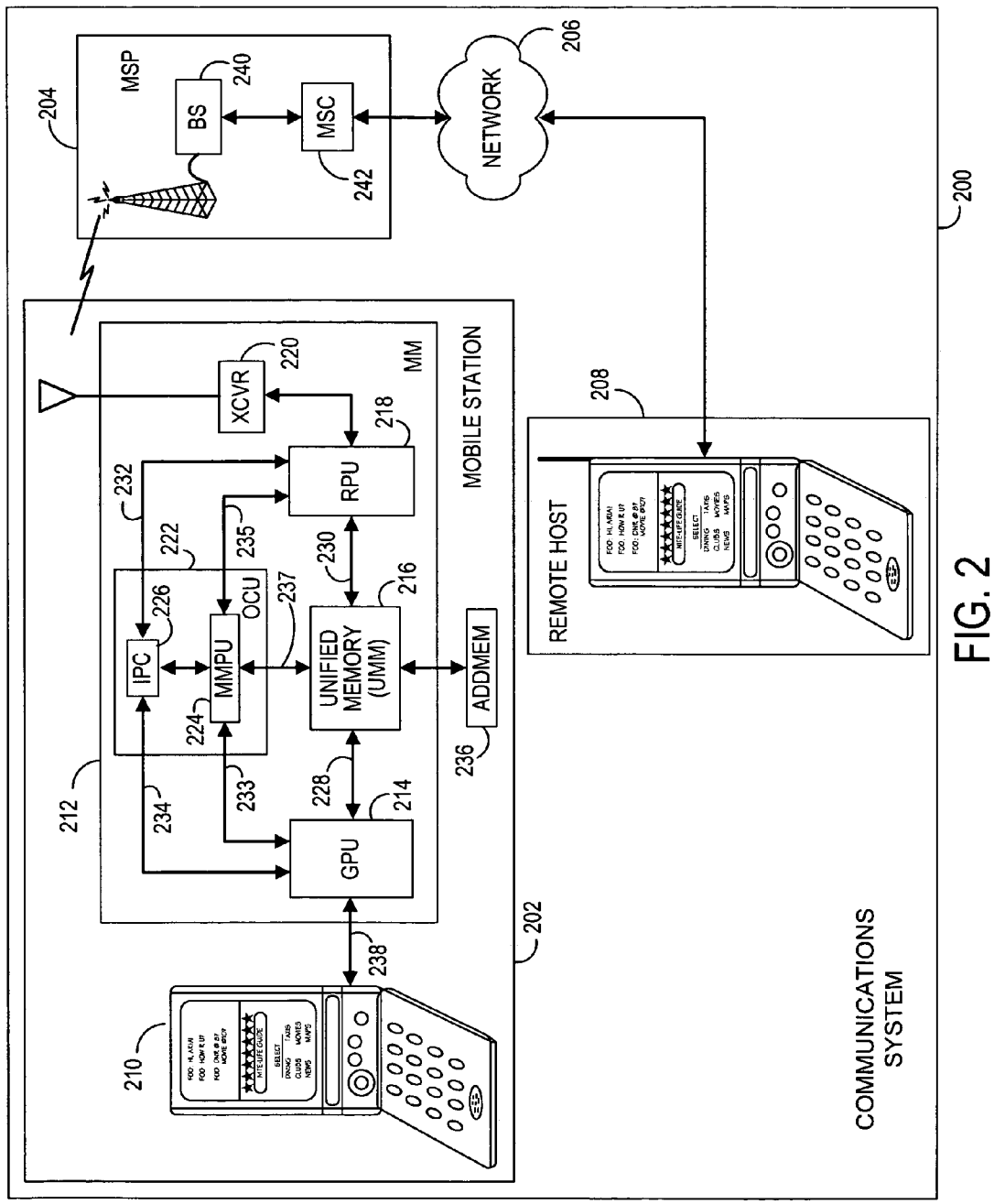
FIG. 2 is a another simplified functional block diagram illustrative of a multiprocessor wireless communications system having unified memory fabricated on a monolithic semiconductor chip.

In FIG. 2, a functional block diagram illustrating communication system 200 is depicted. Similar to the manner shown in communication system 100 of FIG. 1, MS 202 can exchange messages over NETWORK 206 with REMHOST 208, by communicating signals with MSP 204. MS 202 may include MPH 210, capable of exchanging messages between MM 212 and a user of MPH 210; and MM 212, capable of exchanging messages between MPH 210 and MSP 204 via BS 240. Similar to MSP 104 in FIG. 1, MSP 204 may couple one or more BS 240 to NETWORK 206 using MSC 242; however, other configurations are possible. In an exemplary implementation of MS 202, MM 212 can include a first processing unit (GPU) 214 adapted for general applications, unified memory module (UMM) 216, and a second processing unit (RPU) 218, adapted for computationally applications including, for example, real-time, isochronous, and synchronous signal processing, signal transceiving, and tasks of a single instruction-multiple data type, and so on. Each of GPU 214 and RPU 218 may be representative of a processing unit possessing one or more processing subunits, coprocessors, or processor cores therein.

To augment the respective ranges of tasks efficiently performed, one or more of GPU 214, RPU 218 may be augmented with functional constituents providing enhanced processing capabilities. Such enhanced processing capabilities, may permit GPU 214, RPU 218, or both, to efficiently perform processing tasks typically performed by another type of processing unit, allowing for parallelism or complimentary task processing. GPU 214, RPU 218 may be coupled with, and may communicate using, UMM 216. UMM 216 data bus can be coupled with GPU 214, using GPU-to-UMM bus (G-U bus) 228; and with RPU 218, using RPU-to-UMM data bus (R-U bus) 230. Operational control unit (OCU) 222 can include memory management and protection unit (MMPU) 224 and interprocessor communication manager (IPC) 226. MMPU 224 may be coupled with GPU 214, using GPU-to-MMPU bus (G-M bus) 233; and with RPU 218, using RPU-to-MMPU (R-M bus) 235. IPC 226 may be coupled with GPU 214, using GPU signal bus (GBUS) 234; and with RPU 218, using RPU signal bus (RBUS) 232. Also, MMPU 224 may be coupled with UMM 216, using memory control bus (MCB) 237. Some implementations of MM 212 may couple MMPU 224 and IPC 226, where such resource management and control communication is desirable. Communications may proceed bidirectionally on one or more of G-U BUS 228, R-U BUS 230, GBUS 234, G-M BUS 233, RBUS application-specific instruction set extensions and operations, including multimedia extensions, and R-M BUS 235. It also may be desirable that communication on MCB 237 be bidirectional.

MMPU 224 may implement memory management and allocation policies for UMM 216 to coordinate memory intercommunication between GPU 214 and RPU 218. MMPU 224 also may manage memory resources for predetermined functional constituents. In MM 212, the range of memory locations constituting UMM 216 may be represented by a unified memory map, in which memory locations may be accessible to the processing units and to predetermined functional constituents in MM 212, including GPU 214 and RPU 218. MMPU 224 may be configured to merge memory locations of ADDMEM 236 into the existing unified memory map, thereby facilitating MS 202 reconfiguration, feature expansion, feature upgrading, and so on. ADDMEM 236 can be inexpensive commodity memory devices having operational characteristics substantially compatible with those of UMM 216. Exemplary memory devices can include SDRAM, DDR, RDRAM® memory, and so on.

MMPU 224 also may be configured to provide a fault inhibition mechanism, by which a nocent informon may be identified and inhibited from at least one of storage, access, or execution by a processing unit or functional constituent, reducing the likelihood that such nocent informon may lead to an operational fault in MM 202. An exemplary technique to inhibit nocent informon access, execution, or both, can include identifying a nocent informon prior to storage in a memory location for a processing unit, or functional constituent, which may be affected deleteriously by the informon; and preventing the nocent informon from being stored in that memory location. In addition, it also may be desirable to provide a perceptible indication of nocent informon presence, for example, on a display which may be present on MPH 210. Also, it may be desirable to retain selected nocent information for analysis, tracking, and the like. Further, it may be advantageous for MMPU 224 to effect a predetermined fallback state in MS 202 responsive to a preselected nocent informon. Thus, it may be possible for MMPU 224 to partially inhibit a device fault in MM 212, allowing MS 202 to function, despite a deleterious response to a nocent informon.

IPC 226 may provide supervisory and support services such as task scheduling and priority setting, interrupt control and coordination, and resource allocation, thus facilitating multitasked, multithreaded operations executed by GPU 214. IPC also may include supervisory and support services for time-sensitive tasks executed by RPU 218, such as real-time, synchronous, and isochronous operations, as well as control and coordination of shared or cooperative tasks involving GPU 214, RPU 218, and functional constituents. IPC 226 can provide or supervise energy and power management functions, and selected reconfigurations of processing units and functional constituents where such processing units and functional constituents in MM 212 are configured to do so. IPC 226 may encompass operating system and application programming interface (API) kernels, microcode, and extensions, interpreters, and virtual machine functions, including those of a cross-platform nature, which may endow MS 202 with the ability to execute popular applications such as those found in desktop computers, entertainment devices and systems, information management, geospatial information services (GIS), context awareness, and the like. IPC 226 also may include one or more direct interfaces for input/output connections and devices, including, without limitation, a wired link such as a USB™ On-The-Go™ link, or an IEEE Std. 1394 link; wireless links, such as an IEEE Std. 802.11 wireless LAN link, an IEEE 802.15 wireless personal area network (PAN) link, a BLUETOOTH® PAN link, and IEEE Std. 802.16 broadband wireless metropolitan area network link; and optical/infrared wireless links, such as a wireless IrDA® infrared link. The direct interfaces also may be adapted for a digital camera and imaging device, as well as an advanced color LCD controller and display; a high-fidelity digital audio capture and playback device; a secure interface, such as Multimedia Card (MMC) interface or Secured Digital (SD) interface; and a device communicating with external storage devices and media. Interface functional constituents may be disposed in the MM 212 chip, other than with IPC 226. (The IEEE® mark is representative of standards and specifications promulgated under the aegis of The Institute of Electrical and Electronics Engineers, Inc., Piscataway, N.J., USA. The USB™ On-The-Go™ mark is representative of the universal serial bus (USB) peripheral device mobile interconnectivity link, as specified under the aegis of USB Implementers Forum, Inc. Portland, Oreg., USA. The BLUETOOTH® mark is representative of a particular short-range wireless technology specified under the aegis of the Bluetooth SIG, Inc., Overland Park, Kans., USA. Similarly, the IrDA® mark is representative of a particular short-range infrared wireless technology, specified under the aegis of the INFRARED DATA ASSOCIATION® Walnut Creek, Calif., USA.)

Processing units GPU 214, RPU 218 may be configured according to a homogeneous multiprocessing model, to a heterogeneous multiprocessing model, or to a hybrid multiprocessing model. In a homogeneous multiprocessing model, two or more processing units, each substantially similar in structure and function, may process messages being exchanged through MM 212. In a heterogeneous multiprocessing model, at least one of the processing units GPU 214, RPU 218 may be dissimilar in structure, function, or both. A hybrid multiprocessing model may have features of homogeneous and heterogeneous multiprocessing models. Conveniently, MM 212 can be adapted to be one of a homogeneous multiprocessing model, a heterogeneous multiprocessing model, and a hybrid multiprocessing model, which may foster the development of a flexible platform core for MS 202, based on a library of selectable configurations for multiprocessor module MM 212. In one example, each processing unit GPU 214, RPU 218 may possess a similar microprocessor core, but may be tailored with one or more different processing constituent(s). In general, exemplary GPU 214 can be configured to perform multithreaded, multitasked operations, and advantageously execute user-oriented application programs. Likewise, exemplary RPU 218 can be configured to perform real-time, deterministic, calculation-intensive operations, and advantageously execute communications and signal processing programs. GPU 214 and RPU 218 may be configured or augmented with application-specific logic, accelerators, engines, microcontrollers, or functional modules, such as those commonly found in intellectual property (IP) libraries, and also may include coprocessors to assist with common, processing intensive tasks.

One or both of GPU 214 and RPU 218, as well as processing subunits within, may be augmented with selected functional constituents. Thus, RPU 218 can be adapted with special purpose processor constituents including, without limitation, specialized computation, graphics, signal/image processing, encryption, signal mapping, and modem constituents. Similarly, GPU 218 can be adapted with general application constituents such as text and data processing engines, multitasking and multithreading operation controls and pipelines, operating system kernel subunits compression/decompression unit, and multimedia constituents. Beneficially, MS 202 can be configured to span a vast spectrum of potential consumer needs with application-oriented interfaces such as wideband stereo codecs, speech recognition and synthesis, whiteboarding, polyphonic synthesizers, JPEG and MPEG encoders/decoders, browsers, and the like also may be integrated into MS 202, resulting in a rich consumer feature set. Popular browser capabilities, polyphonic synthesized music and tones, and hands-free interaction with MS 202 may be included in such a feature set initially, or may be added after manufacture or point-of-sale, at least in part, by software-based reconfiguration.

Beneficially, some functional constituents added to complement, or to extend, the processing capabilities of one core processing unit, may overlap processing capabilities of another processing unit within the multiprocessor module. Such an overlap may provide the multiprocessor module with advantages of parallel processing. For example, where exemplary core RPU 218 is capable of encryption/decryption, it may be desirable to augment GPU 216 with a encryption/decryption engine functional constituent. During a period of light use of GPU 216, and of heavy use of RPU 218, encryption/decryption tasks can be shared or assumed by GPU 216. Similarly, RPU 218 can be augmented, for example, with image and video constituents so that, during a period when RPU 218 has spare processing capacity, a compute-intensive image or video task may be processed substantially in parallel by GPU 216 and RPU 218. Processing units, such as GPU 214, RPU 218 may operate cooperatively, for example directed by a master processor such as RPU 118.

Figure 3:
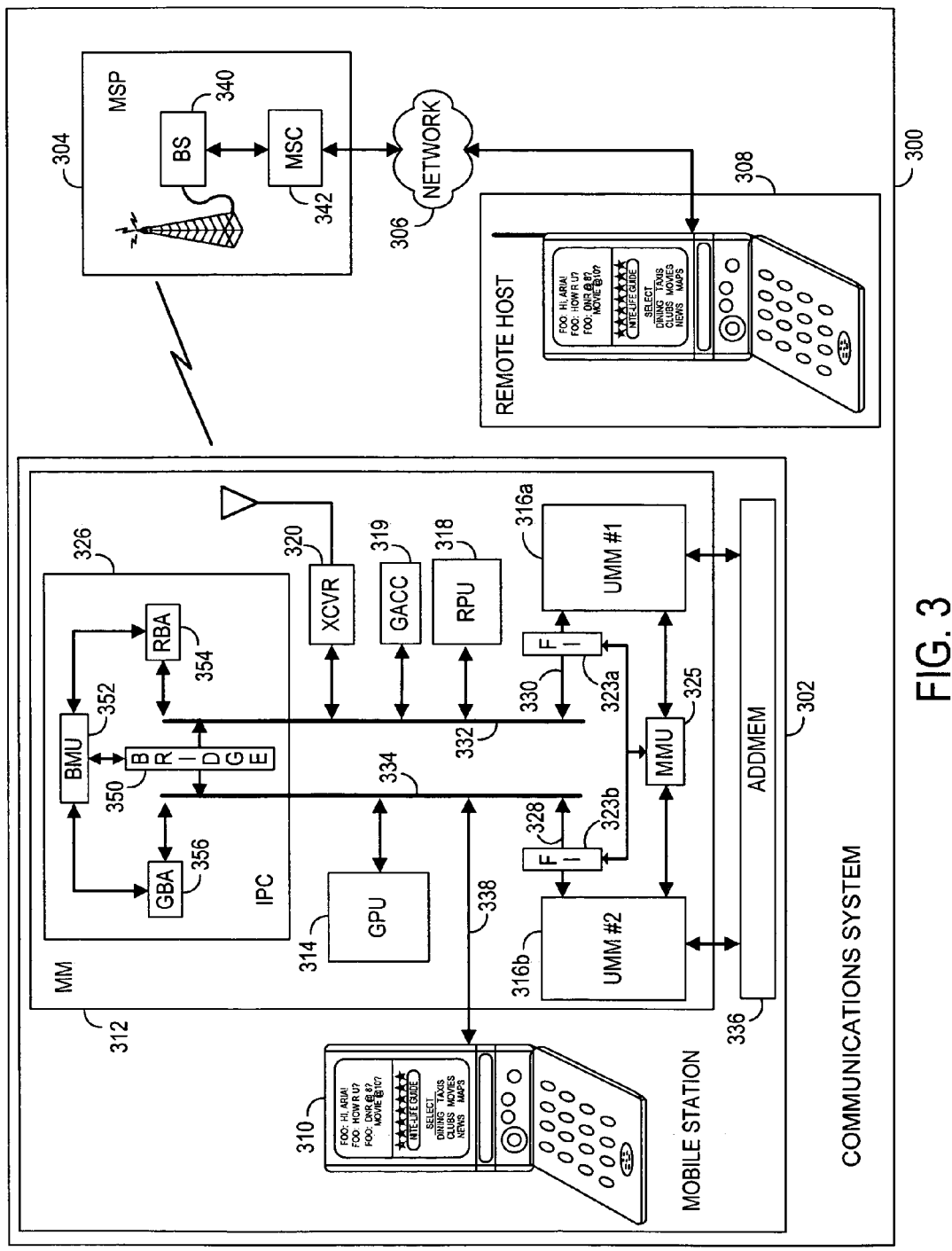
FIG. 3 is a yet another simplified functional block diagram illustrative of a multiprocessor wireless communications system having unified memory fabricated on a monolithic semiconductor chip.

FIG. 3 depicts a functional block diagram illustrating communication system 300, in which MS 302 communicates with MSP 304 in order to exchange messages with REMHOST 308 over NETWORK 306. MS 302 may include MPH 310, MM 312, and ADDMEM 336. Similar to MPH 210 in FIG. 2, MPH 310 in FIG. 3 is representative of a perceptible interface, which may be capable of exchanging messages between MM 312 and a user of MPH 310. MPH 310 may exchange a message between MM 312 and a human user, or may exchange a message between MM 312 and a delegate device coupled to MPH 310, such as by a wired connection or a wireless link (not shown). Moreover, MPH 310 may represent a multimodal human-computer interface capable of communicating multiple data streams during message exchange. Furthermore, MPH 310 may be coupled to MM 312 using a wireless link, for example, a personal area network and the like. Such a link may allow MS 302 to be handheld as a single device, or used as separate but cooperatively coupled components as may be found in a personally-portable wireless device, a portion of which may be wearable or may be in close proximity to the user. MM 312 may include multiple processing units, such as GPU 314 and RPU 318, and functional constituents such as graphics accelerator (GACC) 319, XCVR 320, and IPC module 326. GACC 319 may be a dedicated processor adapted to handle specialized tasks dealing with graphics and video, reducing the processing load on a processing unit, and potentially improving the multimedia performance of MS 302.

In exemplary MM 312, RPU 318, GACC 319, and XCVR 320 may be operably coupled to RBUS 332. Advantageously, RBUS 332 may be adapted to process time-sensitive tasks, including those involving real-time, synchronous, near-real-time, isochronous, and related processing signals and messages. Similarly, MPH 310 and GPU 314 may be operably coupled to GBUS 334. GBUS 334 advantageously may be adapted to convey application-oriented signals and messages. Although GACC 319 is illustrated to be disposed on RBUS 332, GACC 319 also may be disposed on GBUS 334. This configuration may be desirable where GACC 319 is adapted to boost multimedia performance of GPU 314. Other couplings and configurations are possible, and it is desirable that GBUS 334 and RBUS 332 are cooperatively coupled to facilitate overall efficiency and performance by MM 312 and, by extension, MS 302. Interprocessor control signals and selected data transfer may be accomplished with IPC 326 using, for example, bus management unit (BMU) 352. BMU 352 may be configured to perform message and signal transaction initiation, bus resource tracking and allocation, interrupt management and IRQ support, bus master and bus control, power control, memory security control, DMA support, external peripheral and port access and control.

BMU 352 may employ RBUS arbiter (RBA) 354 and GBUS arbiter (GBA) 356 to communicate control and other signal and messages with RBUS 332 and GBUS 334, respectively. Bus-to-bus data transfer may be provided by BRIDGE 350. A bus-to-bus data transfer may be desirable, for example, to transmit data (signals or messages) to or from RPU 318, GACC 319, or XCVR 320, as well as other functional constituents coupled to RBUS 332, to MPH 310. Such a data transfer may or may not be accomplished with the intervention of GPU 314. Also, BRIDGE 350 may perform signal conditioning for signals being communicated between RBUS 332 and GBUS 334. Signal conditioning may include, without limitation, voltage level shifting, current level shifting, timing control, signal transcoding, signal format manipulation, and a combination thereof.

One or both of data transfer and signal conditioning may be managed by BMU 352 and further facilitated by one or both of arbiters RBA 354, GBA 356. Arbiters RBA 354, GBA 356 also may control access and data transfer along the corresponding bus RBUS 332, GBUS 334, by processing units and functional constituents coupled to respective bus RBUS 332, GBUS 334. BMU 352 may be used to control energy or power consumption by powering down all or part of a bus identified as idle, as well as to initiate an energy- or power-saving mode in selected processing units or functional constituents coupled with a bus.

Processing units GPU 314 and RPU 318 can communicate through memory module #1 (UMM #1) 316a and memory module #2 (UMM #2) 316b. Allocation of, and access to, memory locations in UMM #1, UMM #2 may be effected by the functional constituent, memory management unit (MMU) 325, and may be in cooperation with the functional constituent, FI 323a, 323b. FI 323a can be interposed between RBUS 332 and UMM #1 316a, e.g., disposed on R-M bus 330. FI 323b can be interposed between GBUS 334 and UMM #1 316b, e.g., disposed on G-M bus 328. FI 323a, 323b may function alone or in combination to inhibit operational faults corresponding to nocent informons. Memory resource management also may be in cooperation with processing units and other functional constituents. For the convenience of exposition, UMM #1 316a is depicted as being coupled with RBUS 332 and, thus, with processing unit RPU 318, functional constituent GACC 319, and functional constituent XCVR 320. Similarly, UMM #2 316b is depicted as being coupled with GBUS 334 and, thus, with GPU 314 and MPH 310. Other beneficial memory configurations are possible.

Advantageously, a portion of one or both of UMM #1 316a, UMM #2 316b can be configured to provide processing units GPU 314, RPU 318 with common access to memory resources in that memory portion, i.e., the unified memory portion. For example, UMM #2 316b may include a unified memory portion, accessible to both GPU 314 and to RPU 318. In addition, functional constituents such as GACC 319, XCVR 320, IPC 326, and the like, also may be permitted by MMU 325 to access the unified memory portion. In another example, a first portion of UMM #1 316a and a first portion of UMM #2 316b may form unified memory, with a second portion of UMM #1 316a being reserved for use by RPU 318 and a second portion of UMM #2 316b being reserved for use by GPU 314. In addition, MMU 325 may coordinate access to reserved and unified memory by functional constituents such as GACC 319, XCVR 320, IPC 326, and the like. MMU 325 and FI 323a, FI 323b may also cooperate to support one or more ADDMEM 336, thereby allowing unified memory to be extended beyond on-chip memory UMM #1 316a, UMM #2 316b into ADDMEM 336, as such may be warranted. MMU 325 may be configured to provide reserved portions of memory in ADDMEM 336 for selected processing units and functional constituents, as well.

In conjunction with MMU 325, memory protection units FI 323a, FI 323b, also may be configured to identify, to intercept, and to inhibit storage of a nocent informon in a memory location represented by one or more of UMM #1 316a, UMM #2 316b, and, if so configured, ADDMEM 336. Furthermore, units FI 323a, FI 323b may be adapted to identify nocent informons, which may lead to an operational fault state, if accessed or executed. Adaptation of units FI 323*a*, FI 323*b* also may prevent one or both of access and execution of a nocent informon, by a processing unit, such as GPU 314, RPU 318, or functional constituent, such as GACC 319, or XCVR 320. Thus, units FI 323*a*, FI 323*b* may, alone, or in combination with MMU 325, reduce the likelihood that such nocent informon may lead to an operational fault state in MM 312 or MS 302. Additionally, processing unit GPU 314, RPU 318, or a functional constituent, such as GACC 319, XCVR 320, and the like, may cooperate with one or more of FI 323*a*, FI 323*b*, to inhibit an operational fault state which may correspond to a nocent informon.

An exemplary technique to inhibit an operational fault state corresponding to a nocent informon includes a protection unit FI 323*a*, FI 323*b* identifying a nocent informon, and preventing the nocent informon from being stored (written) in a memory location. It may be desirable for protection unit FI 323*a*, FI 323*b* to identify a nocent informon, and to inhibit an operational fault by inhibiting processing or accessing of a nocent informon, where such processing or accessing may correspond to an operational fault state. In addition, it also may be desirable to provide a perceptible indication of nocent informon presence, for example, on a display, which may be present on MPH 310. Also, it may be desirable to retain selected nocent information for analysis, tracking, and the like, to transmit the selected information to a service provider, such as MSP 304, for system-wide incident tracking, reporting, and so on. Further, it may be advantageous for MMU 325, alone or in combination with FI 323*a*, FI 323*b*, to effect a predetermined fallback state in MS 302, responsive to a preselected nocent informon. Thus, it may be possible for MMU 325, and for FI 323*a*, FI 323*b*, to partially inhibit a device fault in MM 312, allowing MS 302 to function, despite the presence of a nocent informon.

Figure 4:
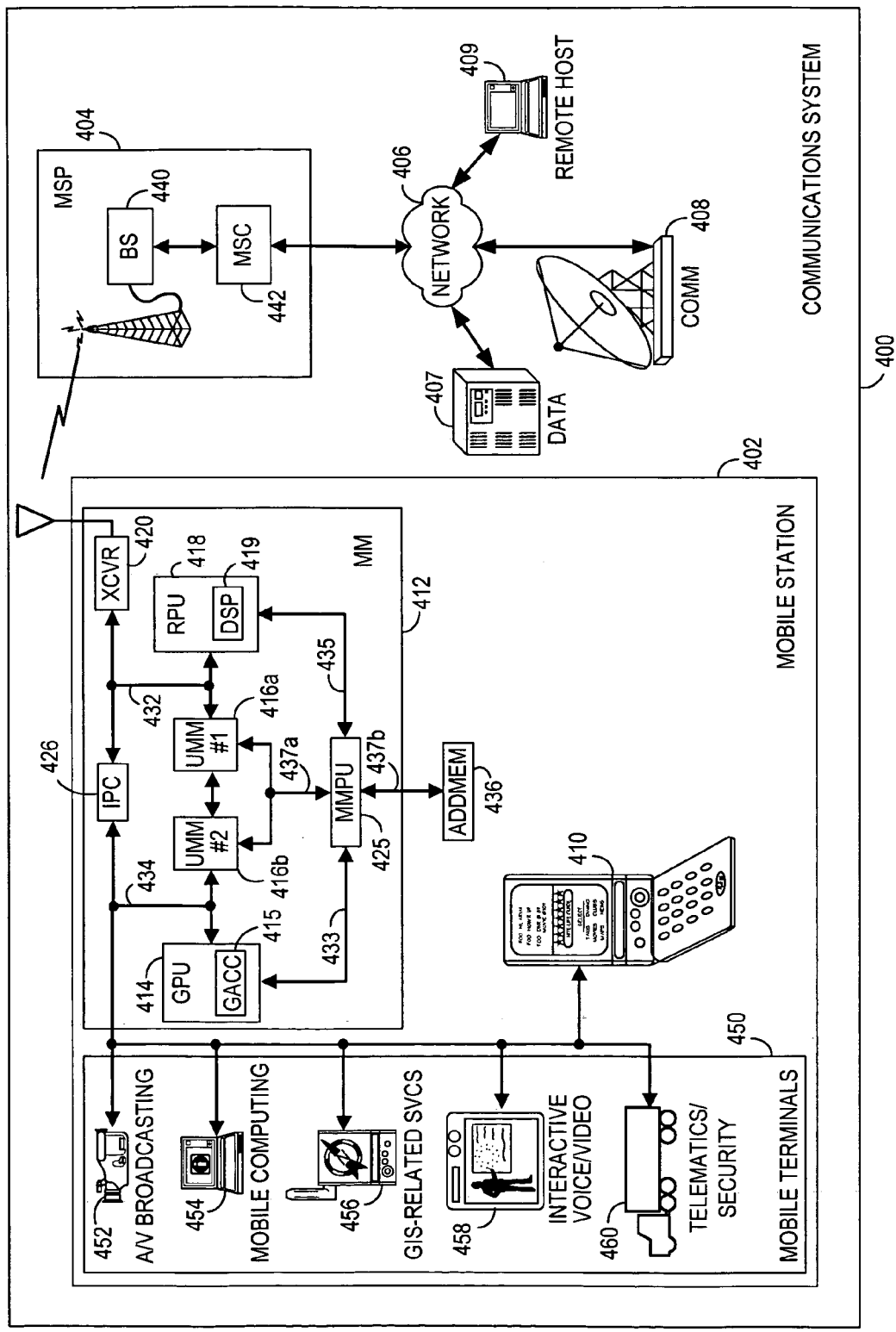
FIG. 4 is still another a simplified functional block diagram illustrative of a multiprocessor wireless communications system having unified memory fabricated on a monolithic semiconductor chip.

FIG. 4 depicts a functional block diagram illustrating communication system 400, in which MS 402 communicates with MSP 404 in order to exchange messages over NETWORK 406 with one or more data provider (DATA) 407, communication link (COMM) 408, and REMHOST 409. MS 402 can include MM 412, which may be coupled with handheld MPH 410. MM 412 also may be coupled with mobile terminals 450, alone or in combination with MPH 410, to offer a user a full spectrum of wireless mobile services. Exemplary wireless mobile terminals include mobile terminal 452, allowing mobile, handheld A/V broadcasting; mobile terminal 454, providing mobile, handheld computing; mobile terminal 456, providing GIS services, location awareness, and context awareness; mobile terminal 458, bringing interactive voice/video conferencing to the mobile milieu; and mobile terminal 460, providing mobile telematics, security, or health monitoring. Where mobile terminal 450 is used in conjunction with MPH 410, for example, mobile terminal 450 may be coupled to MM 412 using a wired link, such as a USB™ ON-THE-GO™, or IEEE-1394, fixed wire connection, or wireless link, such as an IEEE-802-based PAN link or a BLUETOOTH™ PAN link, or an optical or infrared wireless link, such as an wireless IrDA® infrared link.

FIG. 4 also depicts yet another, non-limiting, exemplary configuration of MM 412. GPU 414 illustrates that GACC 415 may be incorporated as an extension of the general processing unit core forming GPU 414, so that GPU 414 and GACC 415 may be tightly integrated, possibly for the benefit of graphics- and image-intensive applications. RPU 418 illustrates that DSP 419 may be incorporated as an extension of a communications processing unit core, so that RPU 418 and DSP 419 also may be tightly integrated, possibly for the benefit of communicating high-bandwidth messages using a variety of selectable channels and services. MM 412 also may be augmented with functional constituents including, for example, interfaces, logic assemblies, registers, counters, asynchronous logic, special purpose microcontrollers, and so forth (not shown).

IPC 426 can couple and manage communication between GM bus 434 and RM bus 432, and it is desirable that GM bus 434 and RM bus 432 are cooperatively coupled to facilitate overall efficiency and performance by MM 412 and, by extension, MS 402. Although GPU 414 and RPU 418 generally and advantageously may communicate through unified memory, functional constituent IPC 426 may also provide significant message and control signal exchanges between GM bus 434 and RM bus 432. For example, IPC 426 may be configured to perform message and signal transaction initiation, bus resource tracking and allocation, interrupt management and IRQ support, bus master and bus control, power control, memory security control, DMA support, external peripheral and port access and control, bus-to-bus data transfer, signal transcoding, and signal conditioning. IPC 426 also may be used to control energy or power consumption by powering down all or part of a bus identified as idle, as well as to initiate an energy- or power-saving mode in selected processing units or functional constituents coupled with GM bus 434, RM bus 432, or both. Furthermore, IPC 426 may include one or more direct interfaces for input/output connections and devices, including, without limitation, a wired link such as a USB™ On-The-Go™ link, or an IEEE Std. 1394 link; wireless links, such as an IEEE Std. 802.11 wireless LAN link, an IEEE 802.15 wireless personal area network (PAN) link, a BLUETOOTH® PAN link, and IEEE Std. 802.16 broadband wireless metropolitan area network link; and optical/infrared wireless links, such as a wireless IrDA® infrared link. The one or more direct interfaces also may be adapted for a digital camera and imaging device, as well as an advanced color LCD controller and display; a high-fidelity digital audio capture and playback device; a secure interface, such as Multimedia Card (MMC) interface or Secured Digital (SD) interface; and a device communicating with external storage devices and media. Although MM 412 and MPH 410 may be intergrated into a single physical unit, a selected interface may separably couple MM 412 with MPH 410. Also, MPH 410 may cooperate with an interface in MM 412 to provide the desired connectivity with an external device or service.

Desirably, MM 412 includes therein memory modules UMM #1 416*a*, UMM #2 416*b*, which may be used by GPU 414 and RPU 418, as well as by selected functional constituents. GPU 414 and memory modules UMM #1 416*a*, UMM #2 416*b* may be coupled with GM bus 434; GPU 414 and memory modules UMM #1 416*a*, UMM #2 416*b* may be coupled with RM bus 432. Each or both of UMM #1 416*a*, and UMM #2 416*b*, may be configured to provide a unified memory, so that the unified memory portion may be a common memory resource for GPU 414 and RPU 418. Thus, although UMM #1 may appear in FIG. 4 to be an entity separate from GPU 414, and UMM #2 416*b* may appear to be a memory entity separate from RPU 418, such may not be the case. UMM #1 416*a*, UMM #2 416*b* may represent distinct, but coupled and cooperating, memory structures, or may represent a single memory structure. Typically, UMM #1 416*a*, UMM #2 416*b* may include inexpensive, high-performance memory structures, such as synchronous dynamic random access memory (SDRAM), double data rate synchronous DRAM (DDR SDRAM or, simply, DDR), RAMBUS™ DRAM (RDRAM), and so on.

In general, MMPU 425 can allocate and manage memory resources in UMM #1 416a, UMM #2 416b, or both, as such resources may be requested by processing units, e.g., GPU 414, RPU 418, or by functional constituents, e.g., IPC 426, XCVR 420, and MMPU 425. Desirably, MS 402 offers a flexible implementation that permits multiple configurations, upgrades, and so forth. To that end, MM 412 may be configured to receive inexpensive commodity memory ADDMEM 436, and MMPU 425 may be configured to allocate and manage the additional memory resources that may be provided by ADDMEM 436. ADDMEM 436 may be configured as an external module including commodity, high-performance memory components, which may be coupled and cooperate with MMPU 425 and UMM #1 416a and UMM #2 416b. Such components may include, for example, SDRAM, DDR SDRAM, RDRAM, and so on. UMM #1 416a, UMM #2 416b may be configured such that memory can be allocated as a unified memory resource, as a reserved or dedicated memory resource, or as a combination thereof.

As with UMM #1 416a and UMM #2 416b, MMPU 425 can configure a portion of ADDMEM 436 as unified memory, or as memory resources to be used differentially by one or more processing units or functional constituents. Thus, allocation and management of memory resources by MMPU 425 may include unified memory, as well as memory which may be reserved for one or more selected processing units and functional constituents.

As in FIG. 1 through FIG. 3, MS 402 may be exposed to an informon corresponding to an operational fault state, and it can be beneficial for MM 412 to be configured to inhibit such an operational fault state. MMPU 425 may beneficially be configured to identify, to intercept, and to inhibit storage of, or access to, a nocent informon in a memory location represented by one or more of UMM #1 416a, UMM #2 416b, and, if so configured, in ADDMEM 436. MMPU 425 alone may manage memory protection, including fault inhibition, for example, by communicating with UMM #1 416a, UMM #2 416b over MCB 437a and with ADDMEM 436 over MCB 437b, whereby nocent informon read/write functions in the respective memory locations may be inhibited. MMPU 425 also may manage memory protection, including fault inhibition, in cooperation with processing units GPU 414, RPU 418, and with functional constituents, including IPC 426. Furthermore, MMPU 425 may be adapted to identify and inhibit nocent informons, which may lead to an operational fault state, before such nocent informons are accessed or executed by communicating with a processing unit or a functional constituent that otherwise may access or execute the nocent informon. For example, on the application side, MMPU 425 may communicate nocent inhibition information with GPU 414, or functional constituent GACC 415, via bus 433. Similarly, on the communication side, MMPU 425 may communicate nocent inhibition information with RPU 414, or functional constituent DSP 419, via bus 435.

MMPU 425 may engage in a combination of such inhibition measures with memory, processing units, and functional constituents such that the likelihood that the presence or introduction of a nocent informon in MM 412 or MS 402 is reduced. An exemplary technique to inhibit an operational fault state corresponding to a nocent informon, includes MMPU 425 identifying a nocent informon, and preventing the nocent informon from being stored (written) in a memory location, for example, in UMM #1 416a, in UMM #2 416b, or in ADDMEM 436. In addition, it may be desirable to provide a perceptible indication of nocent informon presence, for example, on a display, such as may be present on MPH 410. Also, it may be desirable to retain selected nocent information for analysis, tracking, and the like, to transmit the selected information to a service provider, such as MSP 404 or exemplary host DATA 407, for system-wide incident tracking, reporting, and so on. Further, it may be advantageous for MMPU 425 to effect, in the presence of selected nocent informons, a predetermined operational state in MS 402. The predetermined operational state may inhibit development of an operational fault state in MM 412, thus allowing MS 402 to function despite the presence of nocent informons. Moreover, it may be advantageous for MMPU 425 to effect a predetermined fallback state in MS 402 responsive to a preselected nocent informon. Thus, it may be possible for MMPU 425 to partially inhibit a device fault in MM 412, allowing MS 402 to function, despite a deleterious response to a nocent informon.

As with MM 112 in FIG. 1, MM 212 in FIG. 2, and MM 312 in FIG. 3, MM 412 in FIG. 4 can beneficially be disposed on a substrate such that GPU 414, GACC 415, RPU 418, DSP 419, and IPC 426 can be configured as a monolithic integrated circuit. It also may be advantageous for memory, including UMM #1 416a and UMM #2 416b, to be fabricated on the monolithic integrated circuit with GPU 414, and RPU 418. Although shown as a separate entity within MM 412, XCVR 420, and related communications functional constituents, also may be integrated into the "chip" corresponding to MM 412, for example, by augmenting RPU 418 with selected transceiver functional constituents.

Many alterations and modifications may be made by those having ordinary skill in the art without departing from the spirit and scope of the invention. Therefore, it must be understood that the illustrated configurations have been set forth only for the purposes of example, and should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the invention.

What is claimed is:

1. A wireless mobile communication device, configured for exchanging a message with a remote host, comprising:
    a memory having a unified memory portion;
    a plurality of processing units coupled with the unified memory portion, wherein a first processing unit of the plurality of processing units communicates a message through the unified memory portion to a second processing unit of the plurality of processing units;
    a fault inhibitor coupled with the unified memory portion and configured to inhibit an operational fault state corresponding to a nocent informon; and
    an operational control unit coupled with the unified memory portion, the plurality of processing units, and the fault inhibitor, the operational control unit configured to coordinate communication between the first processing unit and the second processing unit through the unified memory portion;
    wherein the unified memory portion, the fault inhibitor, and the plurality of processing units are fabricated on a monolithic integrated circuit chip; and
    wherein the wireless mobile communication device is disposed in a wireless mobile personal host.

2. The wireless mobile communication device of claim 1, wherein the operational control unit is configured to manage memory resources selected as the unified memory portion.

3. The wireless mobile communication device of claim 2, wherein the operational control unit further comprises a memory manager coupled with the memory and the fault inhibitor, wherein the memory manager is configured to cooperate with the fault inhibitor such that the operational fault state corresponding to the nocent informon is inhibited.

4. The wireless mobile communication device of claim 3, wherein the first processing unit is adapted to perform applications operations and the second processing unit is adapted to perform communications operations.

5. The wireless mobile communication device of claim 4, further comprising a functional constituent configured to augment one of the applications operations of the first processing unit and the communications operations of the second processing unit.

6. The wireless mobile communication device of claim 5, wherein the functional constituent is one of an interprocessor communications manager, a graphics accelerator, and a digital signal processor.

7. The wireless mobile communication device of claim 5, further comprising:
an application bus coupled with the first processing unit and adapted to facilitate the applications operations;
a communications bus coupled with the second processing unit and adapted to facilitate the communications operations; and
a bus master unit coupled between the application bus and the communications bus, the bus master unit adapted to communicate one of control signals and messages between the application bus and the communications bus.

8. The wireless mobile communications device of claim 7, further comprising: a transceiver coupled with the communications bus and adapted to use a wireless communication technique to exchange the message with a remote host.

9. The wireless mobile communication device of claim 8, further comprising: a direct interface coupled with one of the applications bus and the communications bus, the direct interface adapted to couple the wireless mobile communication device with an information signal source.

10. The wireless mobile communication device of claim 8, further comprising: a user interface integrated therewith such that the wireless mobile communication device and user interface form a handheld communication device.

11. The wireless mobile communication device of claim 8, further comprising: a user interface separable from the wireless mobile communication device, the user interface being linked to the wireless mobile communication device using one of a wired link and a wireless link, and wherein at least one of the wireless mobile communication device and the user interface is wearable on a user.

12. The wireless mobile communication device of claim 9, wherein the direct interface is adapted to couple the wireless mobile communication device with the information signal source using a wireless link.

13. The wireless mobile communication device of claim 9, wherein the direct interface is adapted to couple the wireless mobile communication device with the information signal source using a wired link.

14. The wireless mobile communication device of claim 1, further comprising: an additional memory device adapted to couple with the memory.

15. The wireless mobile communication device of claim 4, the operational control unit adapted to provide at least one of a process control signal and a memory control signal to coordinate exchange of the message between the first processing unit and the second processing unit.

16. A wireless mobile communication multiprocessor module adapted to exchange a message using wireless communication, comprising:
an application bus;
an applications processing unit coupled with the application bus;
a communication bus;
a communications processing unit coupled with the communication bus;
memory coupled with the application bus and the communication bus, wherein a portion of the memory is unified memory, and wherein the applications processing unit and communications processing unit exchange the message using the unified memory;
a fault inhibitor coupled between the unified memory and one of the communication bus and the application bus; and
an operational control unit coupled with the application bus, the communication bus, the memory, and the fault inhibitor, wherein the operational control unit controls at least one of:
coordinating communication between the application bus and the communication bus;
managing the unified memory for at least one of the applications processing unit and the communications processing unit; and
cooperating with the fault inhibitor to provide a selected response to a presence of a nocent informon;
wherein the applications processing unit, the application bus, the communications processing unit, the communication bus, the fault inhibitor, and the operational control unit are fabricated as a monolithic integrated circuit.

17. The wireless mobile communication multiprocessor module of claim 16, further comprising a functional constituent responsive to the operational control unit and operably coupled with one of the application bus and the communication bus, the functional constituent facilitating one of applications processing unit applications operations and communications processing unit communications operations.

18. The wireless mobile communication multiprocessor module of claim 17, wherein the operational control unit comprises a memory manager cooperating with the fault inhibitor to provide the selected response to the presence of the nocent informon; and wherein the selected response is one of inhibiting an operational fault corresponding to the nocent informon, operating the wireless mobile communication multiprocessor module in a predetermined operational state, and operating the wireless mobile communication multiprocessor module in a predetermined fallback state.

19. The wireless mobile communication multiprocessor module of claim 17, wherein the operational control unit further comprises a bridge coupled between the application bus and the communication bus, the bridge configured to selectively transmit a signal between the application bus and the communication bus.

20. A wireless mobile communication system in which a local host exchanges a message with a remote host using wireless communication, the communication system comprising:
an applications bus coupled with a local host;
an applications processing unit coupled with the applications bus and adapted to execute applications operations;
a transceiver adapted to exchange a message with a remote host using a wireless communication mode;
a communications bus coupled with the transceiver;

a communications processing unit coupled with the communications bus and adapted to execute communications operations;

a memory coupled with the applications bus and with the communications bus, wherein the applications processing unit and the communications processing unit are adapted to exchange the message using a portion of the memory, the portion including unified memory;

a memory controller coupled with the memory, the fault inhibitor, the applications processing unit, and the communications processing unit, the memory controller adapted to control a memory location in the memory;

a fault inhibitor coupled to the unified memory and to one of the communications bus and the applications bus, the fault inhibitor adapted to inhibit an operational fault state corresponding to a nocent informon; and an interprocessor controller coupled to the applications bus and to the communications bus, the interprocessor controller adapted to transfer a control signal between the applications processing unit and the communications processing unit, the control signal facilitating the message exchange in the portion of the memory;

wherein the applications processing unit and the communications processing unit, the applications bus and the communications bus, the interprocessor controller, the memory, the memory controller, and the fault inhibitor are fabricated as a monolithic integrated circuit.

21. The wireless mobile communication system of claim 20, wherein the interprocessor controller further comprises:

a bus management unit coupled between the applications bus and the communications bus, the bus management unit adapted to coordinate communications therebetween; and a bridge coupled with the bus management unit, the applications bus, and the communications bus, the bridge configured to selectively transmit a signal between the applications bus and the communications bus.

22. The wireless mobile communication system of claim 21, further comprising:

an applications bus arbiter coupled with the applications bus and the bus management unit, wherein the applications bus arbiter is adapted to coordinate with the bus management unit a selective transmission of an applications bus signal between the applications bus and the communications bus; and a communications bus arbiter coupled with the communications bus and the bus management unit, wherein the communications bus arbiter coordinates with the bus management unit a selective transmission of a communications bus signal between the communications bus and the applications bus.

23. The wireless mobile communication system of claim 20, wherein the transceiver comprises a functional constituent fabricated on the monolithic integrated circuit.

24. The wireless mobile communication system of claim 23, wherein the wireless communication mode is selectable and the transceiver further comprises a plurality of reconfigurable functional constituents controllable by the local host, wherein the wireless communications mode is selectable thereby.

25. In a wireless mobile communication device configured to exchange a message as a local host with a remote host, the device including at least two processing units operating in association with informons and a memory coupled with the at least two processing units and through which the at least two processing units communicate a message, a method for communicating the message, comprising:

identifying an informon to be examined;

determining whether the informon is a legitimate informon or a nocent informon; and when the informon is the nocent informon, inhibiting storage of the nocent informon, inhibiting access to the nocent informon, or inhibiting execution of the nocent informon;

wherein the wireless mobile communication device comprises:

a memory having a unified memory portion;

a plurality of processing units coupled with the unified memory portion, wherein a first processing unit of the plurality of processing units communicates the message through the unified memory portion to a second processing unit of the plurality of processing units;

a fault inhibitor coupled with the unified memory portion and configured to inhibit an operational fault state corresponding to the nocent informon; and an operational control unit coupled with the unified memory, the plurality of processing units, and the fault inhibitor, the operational control unit configured to coordinate communication between the first processing unit and the second processing unit through the unified memory portion;

wherein the unified memory, the fault inhibitor, and the plurality of processing units are fabricated on a monolithic integrated circuit chip; and wherein the wireless mobile communication device is disposed in a wireless mobile personal host.

26. The method of claim 25, further comprising:

when the informon is the nocent informon, providing a perceptible indication of a presence of the nocent informon.

27. The method of claim 25, further comprising:

when the informon is the nocent informon, inhibiting an operational fault corresponding to the nocent informon.

28. The method of claim 25, further comprising:

when the informon is the nocent informon, setting the wireless mobile communication device in a predetermined operational state.

29. The method of claim 25, further comprising:

when the informon is the nocent informon, setting the wireless mobile communication device in a predetermined fallback state.

30. The method of claim 26, further comprising:

when the informon is the nocent informon, inhibiting an operational fault corresponding to the nocent informon.

31. The method of claim 27, further comprising:

when the informon is the nocent informon, providing a perceptible indication of nocent informon presence.

* * * * *